Dec. 17, 1940.  H. J. MITCHELL  2,225,504
GUARD FOR FISHHOOKS
Filed Oct. 26, 1939
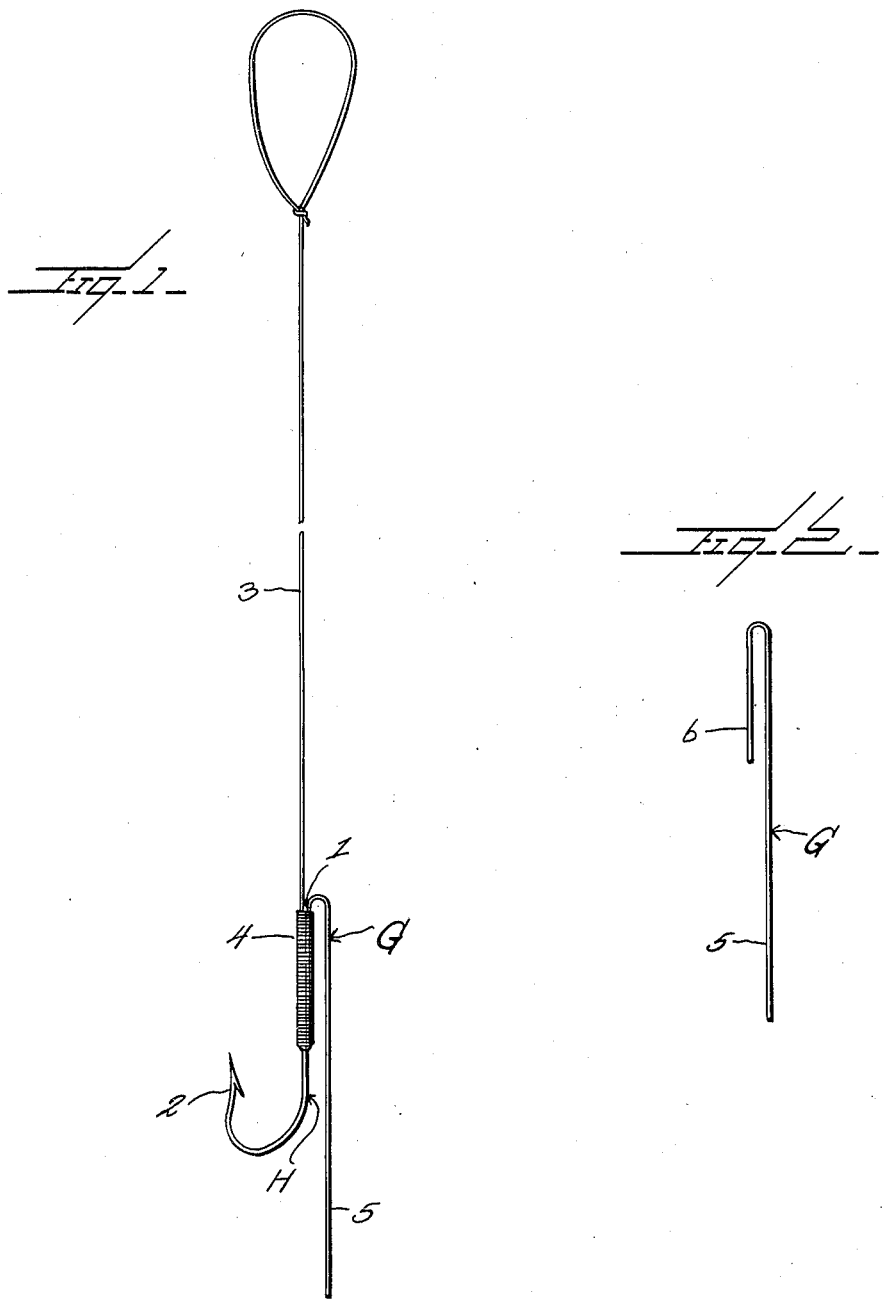
Inventor
H. J. Mitchell
By Watson E. Coleman
Attorney Patented Dec. 17, 1940

2,225,504

UNITED STATES PATENT OFFICE 2,225,504

GUARD FOR FISHHOOKS

Halsey J. Mitchell, Schenectady, N. Y.

Application October 26, 1939, Serial No. 301,476

3 Claims. (Cl. 43—38)

This invention relates to improvements in fishhooks, and it is primarily an object of the invention to provide a gullet guard carried by the shank of the hook in a manner to substantially eliminate swallowing of the hook by the fish.

It is also an object of the invention to provide a guard of this kind of a character which facilitates the fish gripping the point of the hook.

The invention consists in the details of construction and in the combination and arrangement of the several parts of my improved guard whereby certain important advantages are attained and the article rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in elevation of a fishhook having applied thereto a guard constructed in accordance with an embodiment of my invention;

Figure 2 is a view in elevation of the guard as herein comprised unapplied.

As disclosed in the accompanying drawing, H denotes a fishhook of desired size including a shank 1 and the inwardly disposed point 2 at one end portion of the shank. The shank 1 is adapted to be connected to the end portion of a usual snell 3.

As illustrated in the drawing, the snell 3 is securely held to the shank 1 of the hook H by a winding 4 and which winding also serves as a holding or securing medium for the guard G. The guard G, as herein disclosed, is formed of a single strand or length of wire of suitable guage and of a rustproof character. The guard G comprises an elongated member 5 having one end portion returned to provide a short member 6 spaced from and substantially in parallelism with the adjacent portion of the member 5. The member 6 is positioned along the outer portion of the shank 1 of the hook H and at the side thereof remote from the point 2, and this member 6 is securely held to the shank 1 by the hook H through the winding 4 hereinbefore referred to. The member 6, as herein disclosed, is also coplanar with the shank 1 and the inwardly disposed point 2.

The member 5 is of such a length as to extend a material distance beyond the outer end of the hook H so that a fish attracted by the bait carried by the hook H will touch the member 5 with its lips and force the hook H backwardly so that the fish may grab the point 2. By the use of this guard it will at once be evident that the liability of a fish swallowing the hook H is substantially eliminated. It is also believed to be obvious that with the use of my improved guard there will be a material annual saving in small game fish.

From the foregoing description it is thought to be obvious that a guard constructed in accordance with my invention is particularly well adapted for use by reason of the convenience and facility with which it may be assembled and used, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a fishhook having a shank, a guard comprising an elongated member, and means for securing the member to the snell end portion of the shank of the hook with the member at the side of the shank remote from the hook, said member being of a length, when secured to the shank of the hook, to extend a material distance beyond the outer end of the hook.

2. In combination with a fishhook having a shank, a guard comprising an elongated member, and means for securing the member to the snell end portion of the shank of the hook with the member at the side of the shank remote from the hook, said member being of a length, when secured to the shank of the hook, to extend a material distance beyond the outer end of the hook, said applied member, shank and hook being coplanar.

3. In combination with a fishhook having a shank, a guard comprising an elongated member, and means for securing the member to the snell end portion of the shank of the hook with the member at the side of the shank remote from the hook, said member being of a length, when secured to the shank of the hook, to extend a material distance beyond the outer end of the hook, said applied member normally being substantially parallel with the shank.

HALSEY J. MITCHELL.